United States Patent [19]
Hoffmann

[11] 3,821,619
[45] June 28, 1974

[54] SPEED CONTROL SYSTEM FOR REVERSIBLE ELECTRICAL MACHINE

[75] Inventor: Manfred Hoffmann, Erlangen, Germany

[73] Assignee: Siemens Aktiengesellschaft, Munich, Germany

[22] Filed: July 6, 1972

[21] Appl. No.: 269,430

Related U.S. Application Data

[63] Continuation of Ser. No. 24,218, March 31, 1970, abandoned.

[30] Foreign Application Priority Data
Apr. 2, 1969   Germany .......................1916875

[52] U.S. Cl. ............................. 318/138, 318/254
[51] Int. Cl. .......................................... H02k 29/04
[58] Field of Search ........................... 318/138, 254

[56] References Cited
UNITED STATES PATENTS
3,375,422   3/1968   Boudigues........................ 318/138
3,418,550   12/1968   Kocatorowicz..................... 318/138
3,569,804   3/1971   Studer................................ 318/138
3,577,049   5/1971   Madurski........................... 318/138

*Primary Examiner*—Bernard A. Gilheany
*Assistant Examiner*—Thomas Langer
*Attorney, Agent, or Firm*—Arthur E. Wilfond et al.

[57] ABSTRACT

A receiver connected to the ends of the armature winding of a reversible electric machine controls the closing of the circuit of the armature winding and therefore controls the armature current flowing through the armature winding. The receiver has a controllable circuit component having a current conducting interval determined by the position of the armature winding relative to the magnetic field of the excitation winding. The current conducting interval determines the rotary speed of the machine. A transmitter galvanically separated from the receiver provides control signals for controlling the current conducting condition of the controllable circuit component of the receiver thereby controlling the rotary speed of the machine.

14 Claims, 12 Drawing Figures

SPEED CONTROL SYSTEM FOR REVERSIBLE ELECTRICAL MACHINE

This is a continuation of application Ser. No. 24,218, filed Mar. 31, 1970.

DESCRIPTION OF THE INVENTION

The invention relates to a reversible electrical machine. More particularly, the invention relates to a speed control system for a reversible electrical machine. The excitation winding of the electrical machine is connected to an AC voltage source and said machine has a single or multiphase armature winding.

It is known to control the speed of an electrical machine having an excitation winding connected to a single phase or multiphase AC voltage source by varying the rotor current by means of resistors in the rotor circuit. To accomplish this, the rotor winding may be connected to the variable resistors via slip rings. The adjustment of the variable resistors determines the magnitude of the rotor current, and thereby determines its speed. In this type of speed control, part of the energy of the rotor curcuit is converted into heat in the resistors. This type of speed control is therefore usually used only for starting operations. Furthermore, the rotor currents may be aligned in the slip ring circuit and may be fed back, via an intermediate DC circuit and a DC to AC inverter, to the input alternating power supply. This type of speed control requires a large amount of equipment.

The principal object of the invention is to provide a new and improved speed control system for a reversible electrical machine.

An object of the invention is to provide a speed control system for a reversible electrical machine, in which the speed control system and the reversible electrical machine are a single structural unit.

An object of the invention is to provide a speed control system for a reversible electrical machine, which speed control system provides continuous and stepless speed control.

An object of the invention is to provide a speed control system for a reversible electrical machine, which speed control system is of simple structure and functions in a simple manner.

An object of the invention is to provide a speed control system for a reversible electrical machine, which system functions to control the speed of the machine with efficiency, effectiveness and reliability.

In accordance with the invention, a receiver comprising at least one controllable structural component is provided for controlling the armature current of an electrical machine. The structural component is controllable in accordance with the position of the armature winding of the electrical machine relative to the excitation field of the electrical machine. The current conducting period of the armature winding determines the speed of the machine. When a control signal is supplied to the receiver, the armature winding is short-circuited and the current flowing in the armature winding delivers a torque having a magnitude which increases with the deflection of the armature winding relative to the magnetic axis of the excitation field. Hence, a change in the firing time occurring while the armature winding moves below the pole division of the excitation field permits the control of the speed of the armature continuously, or without steps, and in a simple manner. To accomplish this, an appropriate transmitter for the control signals may be displaceably provided in the stator of the electrical machine beneath or below the pole division in the direction of movement of the receiver. A plurality of transmitters may be distributed beneath the pole division, in the direction of movement of the receiver. One of the plurality of transmitters transmits the control signals for the receiver, in accordance with a desired speed.

Usually, it is advantageous to design the machine, in accordance with the invention, in a manner whereby the excitation field is at rest and a rotating armature winding is provided. Such an embodiment does not require slip rings for the machine. Under certain circumstances, the armature winding may also rest and the excitation field may rotate. This arrangement has the advantage that the control elements are mounted in stationary relationship in the receivers of the speed control system for the armature current, and are therefore more readily accessible. The accessibility of the receivers may be utilized, for example, for measuring purposes.

If the armature of an electrical motor is driven by an appropriate device, the machine may also operate as a generator. Operation as a motor or as a generator is therefore possible. The excitation winding may be connected to a single phase or multiphase AC voltage source, particularly to an alternating or multiphase current power supply network.

A single armature winding suffices for the operation of the machine. If, in an embodiment of this the axis of the excitation field and the axis of the armature winding happen to be perpendicular relative to each other, when the excitation is being connected into the circuit, the armature winding will not develop a torque and the machine will not start. It is possible to provide such a simple machine design with additional means for starting the machine. Sometimes, a lever for manual starting is sufficient for this purpose. The machine will reliably start automatically when a plurality of armature windings are provided.

When the transmitter is shifted beneath the pole division with regard to the magnetic axis of the excitation field, an armature torque is produced in one direction. When the transmitter is shifted in the opposite direction beneath the pole division, a field is created in the armature winding in the opposite direction. An opposite torque thus results and produces a variation in the direction of rotation of the armature. The speed control is thus equally effective in both directions of rotation.

In a particularly preferred embodiment of the invention, the transmitter of the control signals produced by the speed control system is galvanically separated from the receiver. In accordance with the invention, the galvanic separation is provided by photo or light control or by magnetic control of the components of the receiver. Electrostatic control may also be provided. In order to adjust the armature to a predetermined speed, it is only necessary to change the connection or switching of the armature current in a predetermined spatial position of the armature winding, relative to the magnetic axis of the excitation field.

In order that the invention may be readily carried into effect, it will now be described with reference to the accompanying drawings, wherein.

In the FIGS., the same components are identified by the same reference numerals.

Figure 1:
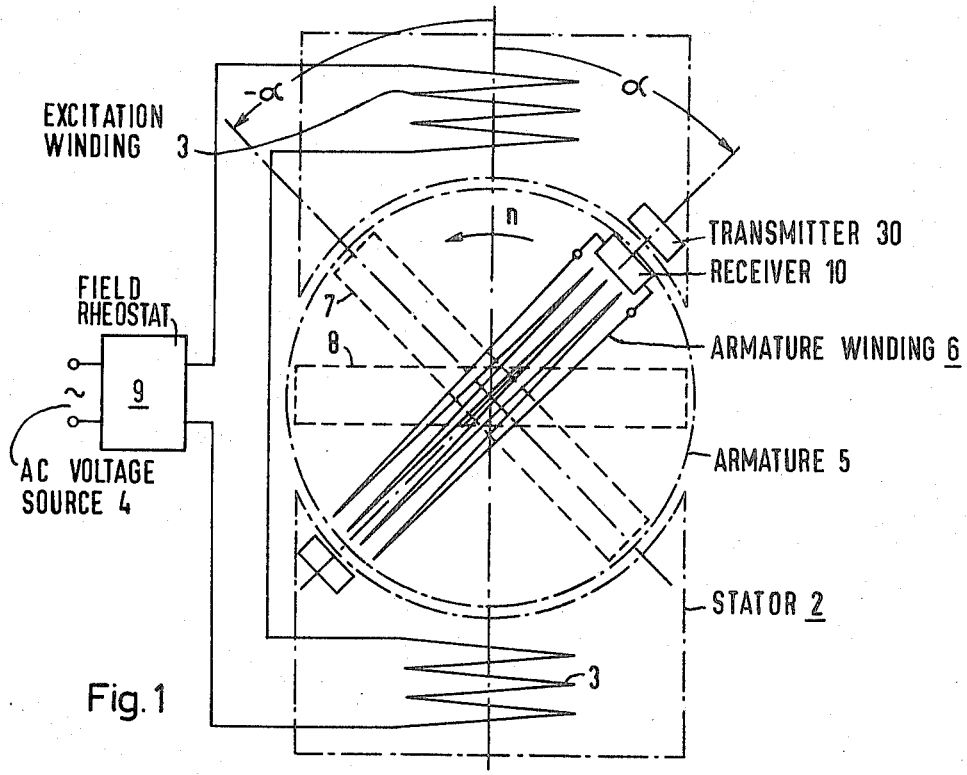
FIG. 1 is a schematic diagram of a reversible electrical machine and the speed control system of the invention.

In FIG. 1, an electrical machine has an excitation winding 3 provided in a stator 2 and connected to an AC voltage source 4. The reversible electrical machine has a rotor or armature 5 having an armature winding 6. The ends of the armature winding 6 are short-circuited via a receiver 10 of the invention. The receiver 10 is described in detail hereinafter and comprises electronic components.

The armature 5 may include additional armature windings 7 and 8, mutually displaced by 60° at the periphery of the armature, and constructed in the same manner as the armature winding 6. If the additional armature windings 7 and 8 are provided, each has a receiver, not shown in FIG. 1, connected to its ends.

A transmitter 30 produces the control signals for controlling the speed of the armature of the electrical machine. The transmitter 30 is positioned beneath or below the pole division of the excitation winding of the electrical machine, displaced by an angle $\alpha$ relative to the magnetic field axis of the excitation winding. The transmitter 30 may preferably be displaced in the direction of movement of the receiver 10, below the pole division.

As soon as the armature winding 6 moves from the neutral region of the excitation field in the direction toward the magnetic axis of the excitation winding 3, a corresponding signal may be supplied from the transmitter 30 to the receiver 10. The receiver 10 closes the circuit in the armature winding 6 and thereby completes the current flow in said armature winding. The armature current flows until the armature winding 6 is positioned in the direction of the axis of the excitation field, whereby the axis of the armature winding is positioned perpendicularly to the field of excitation.

Subsequently, the direction of induction is reversed and the current flow in the armature winding ceases. The spatial control angle $\alpha$ causes an increase in the period of current flow in the armature winding 6. This increases the torque. The speed $n$ of the armature 5 may therefore be controlled in a continuous or stepless manner by the variation of the angle $\alpha$, via appropriate displacement of the transmitter 30, under the pole division.

If the transmitter 30 is displaced beyond the axis of the armature field, toward $\alpha$, the direction of the torque is varied, and therefore the direction of rotation of the armature 5 is varied.

A plurality of transmitters may be utilized instead of the single displaceable transmitter 30. The transmitters are distributed above the pole division. This permits a stepwise control of the speed of the electrical machine.

Under certain circumstances, it may be advantageous to position the transmitter 30 at a rigid angle $\alpha$ at the pole division and to vary the excitation field in the excitation winding 3 via a field rheostat 9 connected in the inputs of said excitation winding. The field rheostat 9 may usually comprise a variable resistor. In accordance with my invention, however, it is preferable to utilize an electronic AC positioner in the inputs to the excitation winding 3. The speed of the machine may then be varied via a phase control of the diodes or transistors of the AC positioner.

Figure 2:
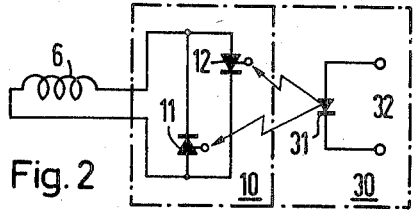
FIGS. 2 to 7 are circuit diagrams illustrating different embodiments of the invention for photo or light control of the speed of the electrical machine.

In FIG. 2, the ends of the armature winding 6 are connected to each other via an antiparallel connection of photosensitive electronic components 11 and 12. The components 11 and 12 are controlled by light from a light source 31 of the transmitter 30. The light source 31 may be energized by a DC or AC voltage source 32. The photosensitive components 11 and 12 may comprise photothyristors, photodiodes, phototransistors or photoresistors, for example. The light source 31 may comprise an incandescent lamp, a glow lamp or a luminescence diode. The light source 31 may also comprise a laser element.

Figure 3:
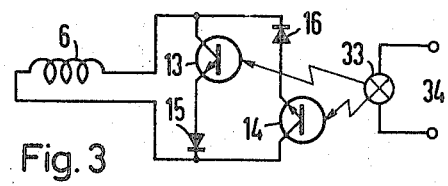

In FIG. 3, the ends of the armature winding 6 are connected to each other via an antiparallel connection of phototransistors 13 and 14. A diode 15 is preferably connected in series with the phototransistor 13 and a diode 16 is preferably connected in series with the phototransistor 14. The light source 33 comprises an incandescent lamp or glow lamp 33 and is energized by a voltage source 34.

Figure 4:
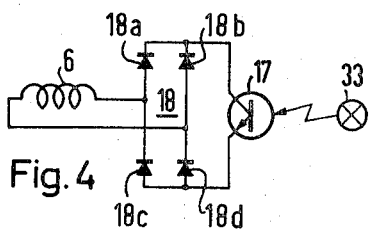

In the embodiment of FIG. 4, the ends of the armature winding 6 are connected to each other via a phototransistor 17 which is controlled by the incandescent lamp 33. A bridge circuit 18 is connected between the phototransistor 17 and the ends of the armature winding 6. The bridge circuit 18 includes four diodes 18a, 18b, 18c and 18d. The armature current through the armature winding 6 is controlled in both directions in the embodiment of FIG. 4.

Figure 5:
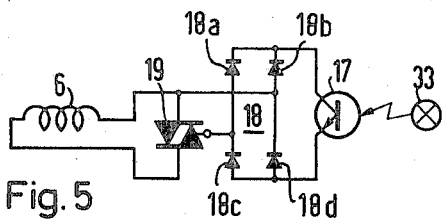

In order to provide a greater capacity, a double path thyristor or Triac 19 may be utilized to control the current through the armature winding 6, as illustrated in the embodiment of FIG. 5. A Triac is a bidirectional triode thyristor produced by the General Electric Company and described in its SCR Manual, Fourth Edition, 1967. The control current of the Triac is provided by the phototransistor 17, which is connected thereto via the bridge circuit 18, including the diodes 18a, 18b, 18c and 18d. The phototransistor 17 is therefore required to provide only a low control current.

Figure 6:
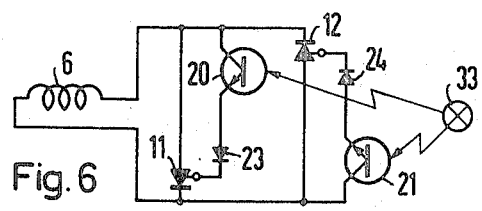

In the embodiment of FIG. 6, the thyristor 11 is controlled by a phototransistor 20 and the thyristor 12 is controlled by a phototransistor 21. The thyristors 11 and 12 are connected in antiparallel connection, as in the embodiment of FIG. 2. The phototransistor 20 is connected in series with a diode 23 and the phototransistor 21 is connected in series with a diode 24. The series connection of the phototransistor 20 and the diode 23 is connected to the control electrode of the thyristor 11 and the series connection of the phototransistor 21 and the diode 24 is connected to the control electrode of the thyristor 12.

Figure 7:
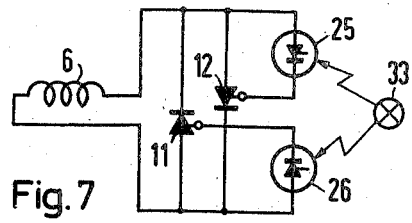

In FIG. 7, an auxiliary thyristor 25 is utilized as an auxiliary switch to control the thyristor 12 and an auxiliary thyristor 26 is utilized as an auxiliary switch to control the thyristor 11. This provides auxiliary switches of great capacity.

Figure 8:
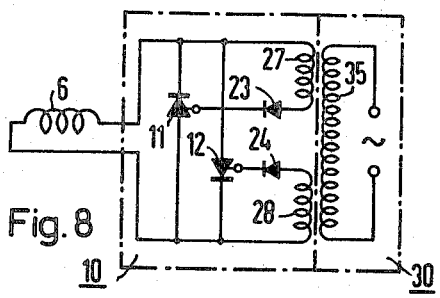
FIGS. 8, 9 and 10 are circuit diagrams illustrating different embodiments of the invention for magnetic control of the speed of the electrical machine.

The embodiment of FIG. 8 is a magnetic control for the thyristors 11 and 12. In the embodiment of FIG. 8, the transmitter 30 comprises a primary winding 35 of a control transformer. One of the secondary windings 27 of the control transformer is connected in series with a diode 23 in the control circuit of the thyristor 11. The other of the secondary windings 28 of the control transformer is connected in series with a diode 24 in the control circuit of the thyristor 12. Since the transmitter 30 and the receiver 10 may be moved relative to each other, the thyristors 11 and 12 fire, or switch to their conductive condition, as soon as the primary and secondary windings 35 and 27 and 28 approach each other at such proximity that they become magnetically coupled.

Instead of the antiparallel connected thyristors 11 and 12 of the embodiment of FIG. 8, a double path thyristor or Triac may be utilized. In such case, only one of the secondary windings 27 and 28 of the control transformer is required to fire the Triac. The secondary current may also control, to full advance, a transistor connected via the bridge circuit to the armature winding 6.

Figure 9:
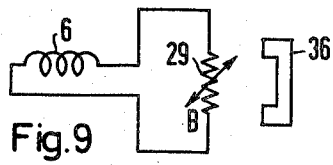

FIG. 9 is an embodiment of a magnetic control system for the direct control of the armature current flowing through the armature winding 6. The embodiment of FIG. 9 utilizes a semiconductor resistor or field plate 29. The field plate 29 is controlled by a magnetic field. The magnetic field is provided by the transmitter, which, in the embodiment of FIG. 9, may comprise a permanent magnet 36.

A plurality of permanent magnets 36 are preferably positioned in an area of the pole division wherein no current flows during the movement of the armature winding 6. As soon as the field plate 29 is removed from proximity of the magnetic field of the magnet 36, the magnetic reluctance is accordingly reduced and the armature current is provided.

The magnet or magnets 36 of the embodiment of FIG. 9 may be embedded in synthetic material, for example, when utilized in small electrical machines such as, for example, toy motors. The magnet or magnets 36 are affixed to the stator of the electrical machine and may block the current in such area of movement. This type of speed control is thus especially simple and is of low vulnerability to disturbances.

Figure 10:
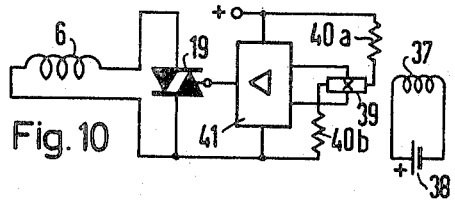

In the embodiment of FIG. 10, a Triac 19 is controlled by the magnetic control of a Hall generator 39 provided in the receiver. The magnetic field within which the Hall generator 39 is positioned, may be preset by an electromagnet 37. The electromagnet 37 may be energized by a DC voltage source 38. The Hall generator 39 is suitably energized by connection of the Hall voltage electrodes to a special source of Hall voltage, not shown in FIG. 10. The Hall voltage electrodes are connected to the Hall voltage source via resistors 40a and 40b, respectively.

The control voltage produced by the Hall generator 39 is preferably supplied to the control circuit of the Triac 19 via an amplifier 41. As soon as the Hall generator 39 moves into the magnetic field of the electromagnet 37, said Hall generator provides the control voltage for the double path thyristor 19 and the armature current commences to flow through the armature winding 6.

Figure 11:
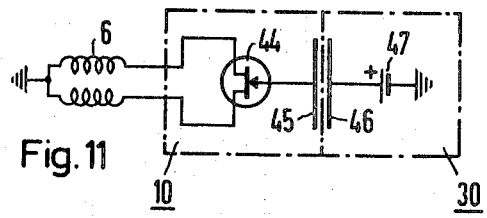
FIG. 11 is a circuit diagram of an embodiment of the invention for electrostatic control of the speed of the electrical machine.

The embodiment of FIG. 11 is for the electrostatic control of the armature current. A field effect transistor 44 is utilized to control the armature current. The control current of the field effect transistor 44 is supplied by a receiver electrode 45 of an electrostatic transformer. The electrostatic transformer has a transmitter electrode 46 connected to a charging voltage source 47, one of the terminals of which source is connected to ground potential. The central point of the armature winding 6 is also connected to a point at ground potential.

The voltage source 47 applies a potential to the electrode 46 of the electrostatic transformer, which potential charges said transformer so that there is a charge on the receiver electrode 45, as soon as said receiver electrode moves into the area of the transmitter electrode 46. The charge current of the receiver electrode 45 of the electrostatic transformer is the control current for the field effect transistor 44 and therefore controls the armature current flowing through the armature winding 6.

Figure 12:
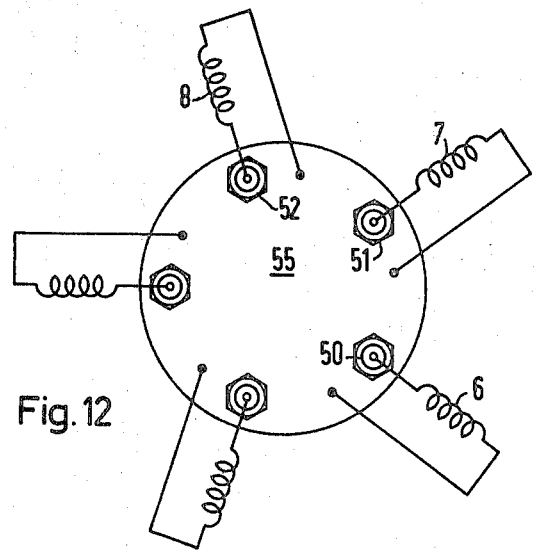
FIG. 12 is a schematic diagram illustrating the components of a receiver of the speed control system of the invention.

In an electrical machine of the type controlled by the speed control system of the invention and having a plurality of armature windings, the components utilized to control the armature currents may be connected to the same source of potential. This is the case when each end of the armature winding is connected in a star connection. To accomplish this, the ends of the armature winding may be connected to a cooling body which may be provided with a principal electrode of the electronic components for controlling the armature currents such as, for example, Triacs 50, 51 and 52 for armature windings 6, 7 and 8, respectively. The other principal electrode of each of the electronic components is connected to the other end of the corresponding armature winding. A cooling body 55 may be affixed to the shaft of the armature 5. This arrangement, illustrated in the embodiment of FIG. 12, provides a particularly simple system for cooling the components of the receivers described herein.

In the illustrated embodiment of the invention, a stationary excitation field is provided. However, spatial displacement of the excitation field may be provided within the scope of the invention. Thus, for example, in machines in which the direction of rotation changes frequently, two excitation windings may be provided which are spaced from each other by 90 electrical degrees at the periphery of the stator. One of the excitation windings is connected to the source of supply voltage for the excitation winding, in accordance with the desired direction of rotation. One of the excitation windings is then controlled in accordance with the direction of rotation of the machine.

A current may flow simultaneously in both windings. The currents may have variable magnitudes, so that the spatial position of the resultant alternating field may be continuously or steplessly displaced in accordance with the magnitude of the currents in the two windings. If, for example, only one winding conducts a current flow, and if the current is first continuously or steplessly increased from zero to the level of the reference current in the other winding, the resultant alternating field is relocated up to the central point between the windings. If, subsequently, the current is reduced in the first winding, the resultant field is displaced toward the second winding.

It is also possible to provide a plurality of excitation windings at the periphery of the stator. Thus, for example, three excitation windings may be provided at the periphery of the stator. In such case, only two of the excitation windings are connected to the AC voltage source. The currents in two of the three windings are provided with a predetermined spatial position of the resultant magnetic field. When another excitation winding has voltage applied to it, the position of the magnetic field is also varied. A continuous or stepless displacement of the magnetic field is also possible when the current is displaced continuously or steplessly. This results in the current reduction in the one excitation winding causing a corresponding current increase in the other excitation winding.

While the invention has been described by means of specific examples and in specific embodiments, I do not wish to be limited thereto, for obvious modifications will occur to those skilled in the art without departing from the spirit and scope of the invention.

I claim:

1. A speed controlled reversible electric machine, comprising a stationary excitation winding; an AC voltage source connected to said excitation winding for energizing said excitation winding; a rotating armature winding having ends; receiver means connected to the ends of said armature winding for short-circuiting the circuit of said armature winding and therefore controlling the armature current flowing through said armature winding, said receiver means rotating with the armature winding and having a controllable circuit component rotating with said armature winding and having a current conducting interval; and transmitter means galvanically separated from said receiver means for providing control signals for the passing-by controllable circuit component of said receiver means to start the beginning of said current conducting interval, said transmitter means being displaceable in the direction of the movement of said controllable circuit component thereby controlling the beginning of said current conducting interval and therefore controlling the rotary speed and rotary direction of said machine.

2. A speed controlled reversible electric machine as claimed in claim 1, wherein said receiver means comprises a pair of phototransistors connected in antiparallel relation with each other and a pair of diodes, each of said diodes being connected in series with a corresponding one of said phototransistors, and said transmitter means comprises a source of light.

3. A speed controlled reversible electric machne as claimed in claim 1, wherein said receiver means comprises a double path rectifier bridge circuit having a plurality of diodes, an input connected to the ends of said armature winding and an output and a phototransistor connected to the output of said rectifier bridge circuit, and said transmitter means comprises a source of light.

4. A speed controlled reversible electric machine as claimed in claim 1, wherein said receiver means comprises a Triac connected between the ends of said armature winding, said Triac having a control circuit, and a photosensitive component connected in the control circuit of said Triac.

5. A speed controlled reversible electric machine as claimed in claim 1, wherein said receiver means comprises a thyristor connected between the ends of said armature winding, said thyristor having a control circuit, a first phototransistor and a first diode connected in series in the control circuit of said thyristor, and a second phototransistor and a second diode connected in series in the control circuit of said thyristor.

6. A speed controlled reversible electric machine as claimed in claim 1, wherein said receiver means comprises a first thyristor connected between the ends of said armature winding, said first thyristor having a control circuit, a first photothyristor connected in the control circuit of said first thyristor, a second thyristor connected between the ends of said armature winding, said second thyristor having a control circuit, and a second photothyristor connected in the control circuit of said second thyristor.

7. A speed controlled reversible electric machine as claimed in claim 1, wherein said receiver means comprises a field plate and said transmitter means comprises a source of a magnetic field.

8. A speed controlled reversible electric machine as claimed in claim 1, wherein said receiver means comprises a Triac connected between the ends of the armature winding, said Triac having a control circuit, and a Hall generator connected in the control circuit of said Triac.

9. A speed controlled reversible electric machine as claimed in claim 1, wherein said transmitter means comprises a first electrostatic electrode and said receiver means comprises another electrostatic electrode, a field effect transistor connected between the ends of said armature winding, and means connecting said other electrostatic electrode to said field effect transistor.

10. A speed controlled reversible electric machine as claimed in claim 1, wherein the rotor of said machine has a shaft and the armature of said machine has a plurality of armature windings, and further comprising a common cooling body mounted on the shaft of said rotor and a plurality of semiconductor switching components mounted on said common cooling body and connected to corresponding ones of said armature windings.

11. A speed controlled reversible electric machine as claimed in claim 1, further comprising an electronic AC regulator connected between said AC voltage source and said excitation winding.

12. A speed controlled reversible electric machine as claimed in claim 1, wherein the machine has a stator having a plurality of excitation windings and said excitation windings conduct currents of variable current intensity.

13. A speed controlled reversible electric machine as claimed in claim 1, wherein the transmitter means comprises a plurality of transmitters galvanically separated from said receiver means, distributed in the direction of the movement of said controllable circuit component passing-by and provided to transmit control signals for said controllable circuit component to start the beginning of said current conducting interval, controlling the beginning of said current conducting interval by activating one of said transmitters and therefore controlling the rotary speed and rotary direction of said machine.

14. A speed controlled reversible electric machine, comprising an excitation winding; an AC voltage source connected to said excitation winding for energizing said excitation winding; a rotating armature winding having ends; receiver means connected to the ends of said armature winding for short-circuiting the circuit of said armature winding and therefore controlling the armature current flowing through said armature winding, said receiver means having a controllable circuit component rotating with said armature winding and having a current conducting interval; and transmitter means galvanically separated from said receiver means for providing control signals for the passing-by controllable circuit component of said receiver means to start the beginning of said current conducting interval, said transmitter means being displaceable in the direction of the movement of said controllable circuit component thereby controlling the beginning of said current conducting interval and therefore controlling the rotary speed and rotary direction of said machine.

* * * * *